June 4, 1929.                R. JOKSCH                1,715,659
                           GRIPPING DEVICE
                        Filed Feb. 20, 1925
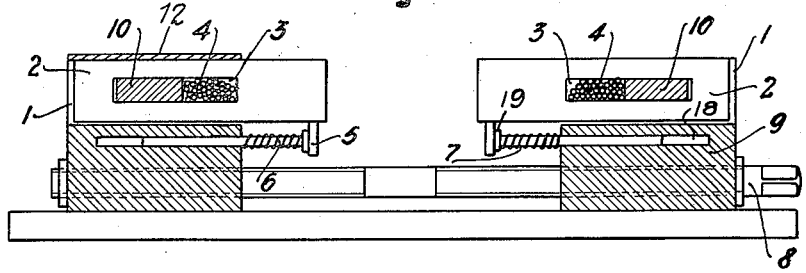
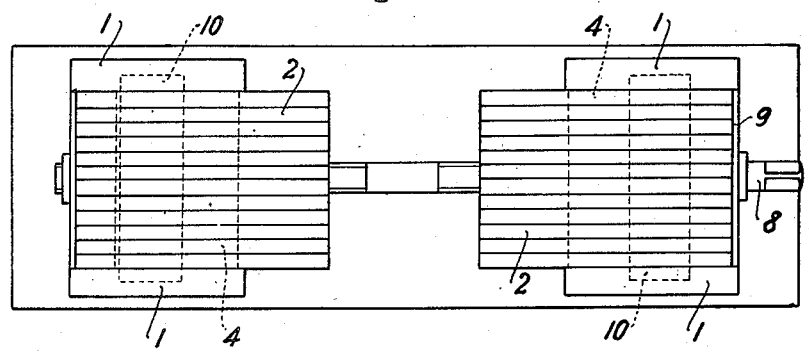
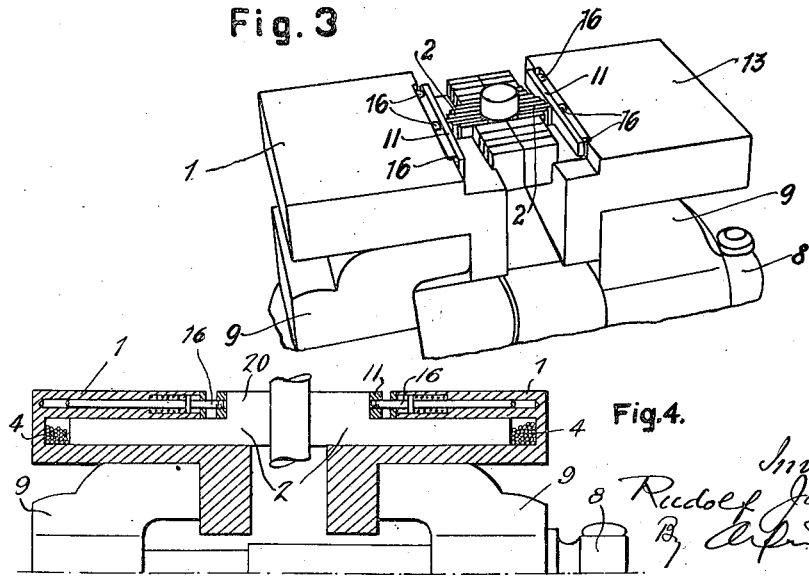

Patented June 4, 1929.

1,715,659

UNITED STATES PATENT OFFICE.

RUDOLF JOKSCH, OF VIENNA, AUSTRIA.

GRIPPING DEVICE.

Application filed February 20, 1925, Serial No. 10,714, and in Austria March 1, 1924.

My invention relates to gripping devices of the kind in which the work piece is gripped along its whole contour at a plurality of points by means of movable jaws consisting of a plurality of individual gripping elements, each of which is capable to be pressed against said work piece, and it particularly relates to gripping devices of the kind mentioned in which the individual gripping elements are forming a movable wall of a chamber filled with a medium consisting of solid particles or of a solid but plastic material. It has for its object to arrange the parts in such a manner that individual adjustment of the gripping elements by virtue of the back pressure of the work piece is possible upon moving the jaws towards the work piece, whereby each gripping element will be capable to assume its position on the contour of the work piece to be gripped by it, without being disturbed or influenced by the movement of any other gripping element of the jaw, while on the other hand the pressure applied on the work piece by the elements upon pressing the jaws towards the same will nevertheless be equally or practically equally distributed among all the individual gripping elements, no device for fixing the gripping elements in their gripping position being necessary and the adjustment and pressure distribution being performed quite automatically.

To obtain this result according to this invention the chamber which is enclosing the medium that is receiving the back pressure of the individual gripping element and which consists of solid particles such as steel balls or rollers or of a plastic or pulverulent material is only partly filled with such medium, thus allowing to utilize the property of such a medium to take any form as long as sufficient space is left into which it may enter, but to act like a solid abutment when the medium is filling entirely said chamber and is enclosed uniformly on all sides. It is thus possible to allow individual adjustment of each gripping element in its correct position in good contact with the work piece at any point of the contour the individual element may happen to face without being influenced by the movement of any other individual gripping element, the medium behind the gripping elements being capable to assume any form within said chamber behind said gripping elements as long as a free space is left, while an equal pressure on all the gripping is exerted upon the gripping elements as soon as any free space in the chamber has disappeared, so that it will act as a solid body simply transmitting the pressure from the block pressed towards the work piece upon the gripping elements proper.

In order to restore the device into working condition after having released the work piece a propelling device for the gripping elements either acting individually on each element or collectively on all elements must be used, which pushes the gripping elements forward out of the chamber to obtain the necessary increase of the free space within the chamber, whereby free movement of the gripping elements to be pushed back by the next work piece to be inserted is allowed until the space within the chamber is again entirely filled with said medium.

The invention is illustrated in the accompanying drawings which show several modifications of the invention.

Fig. 1 of the drawing shows a gripping device, according to this invention in longitudinal section.

Fig. 2 shows a top view of the same modification.

Fig. 3 shows a perspective view of another modification of the invention, and

Fig. 4 shows a section through this modification.

In the device illustrated two movable jaws are provided which consist of slidable blocks 9, capable of being moved towards each other for gripping a work piece by means of a spindle 8 provided with two opposite screw threads in the usual manner. These jaws are provided with suitable faces capable to slide within a bed or a frame as usual. The supporting blocks are carrying a number of individual gripping elements 2 and are provided to this end with a frame 1, embracing and enclosing said gripping elements. The gripping elements are slidably mounted within said frame which may be closed at the top as shown at 12 in Fig. 1.

The gripping elements in this modification are provided with a cavity or recess 3 through which passes the bar 10 which is fastened to the frame 1. There is thus formed a chamber between the bar 10 and the gripping elements 2 of variable volume, said volume being increased when the gripping elements are moved forward towards the work piece, while it is reduced when the gripping elements are pressed back by any work piece inserted between the two jaws.

The chamber contains a pressure transmitting medium 4, which consists of particles of solid material, preferably of small steel balls or rollers or of plastic material such for instance as plastic caoutchouc or some viscous grease or of a pulverulent material. This medium 4 does not fill entirely the chamber 3 when it is extended so as to have its maximal volume by advancing the gripping elements towards the work piece but a free space is left for a purpose hereinafter described.

In this modification each gripping element is moreover provided with a propelling device, which consists of a pin 6 arranged within the block 9 underneath said element and a spring 7 which moves the pin away from the blocks. The pins are supported within suitable bores 18 of the blocks 9 allowing to and fro movement of the pins. At its outer end each pin is provided with a head 19 abutting against a projection 5 of the gripping element, thus pushing said gripping element forward under the action of the spring when no back pressure is exerted upon it.

As already explained the particles of solid material do not fill entirely said chamber and when therefore a work piece is inserted between the two opposing faces of the gripping elements, said elements can be pushed back without appreciable resistance by the work piece when the blocks are moved towards each other by means of the screw 8. Each gripping element is pushed back according to the width of said work piece at the point where the gripping element is applied.

The back movement of each gripping element during the first period can practically be performed without resistance and independently of any movement of any other gripping elements as the medium filled in the chamber 3 will not be capable of transmitting any pressure from one element to the other or from the block to any element as long as free space is left within the chamber not filled by the medium 4. However this free space is reduced more and more as the spindle 8 is moving the jaws towards each other and while this is done, the gripping elements are thus taking their correct position each one being applied against one point of the surface of the work piece. Finally the space within the chamber is reduced to such an extent that its volume will be equal to the volume of the pressure transmitting medium and from this point onward if further pressure is applied, this medium will act like a rigid abutment and will therefore transmit the pressure from the blocks 9 and the bar 10 attached to it to the gripping elements in the same way as if said gripping elements were in solid connection with the bar, and said pressure of the blocks 9 and the bar 10 will be uniformly acting upon all gripping elements which will therefore grip the work piece along its whole contour with uniform or practically uniform pressure.

Thus the gripping elements are automatically adjusted by the back pressure of the work piece during the gripping movement of the jaws and finally will grip the work piece firmly along its entire contour as soon as the medium 4 fills the entire space left within the chamber 3 when the back movement of the gripping elements has reached a certain extent. Whenever the screw 8 is moving the jaws 2 away from each other to release the work piece, the propelling devices 6, 7 will act upon the projections 5 of the gripping elements and will move them again forward so that the chamber 3 is extended. The device is then ready again for further operation.

The arrangement shown in Figs. 3 and 4 is practically the same as that shown in Figs. 1 and 2, the difference residing only in the propelling device.

Instead of an individual propelling device for each gripping element, a common propelling device is arranged which consists of a bar 11 acting upon upwardly protruding extensions 20 of the gripping elements. This bar 11 is actuated by pins 16 which are spring tensioned and will try to push the bar forward, thus taking with it all the gripping elements which have been pushed back, thus restoring the initial working condition when the work piece has been taken away, in which event the volume of the chamber is restored to its original extension, where the medium fills the chamber only partly.

It is thus seen that the medium which is introduced into the chamber 3 performs the function of an abutment which, before acting as such is capable of adapting itself to any shape of the chamber formed partly by the individually movable gripping elements but upon a corresponding movement of the jaws when the space within the chamber is entirely filled will form a rigid abutment allowing pressure to be transmitted from the blocks to the gripping elements, acting like a solid body.

I claim:

1. A gripping device comprising movable jaws composed of individually movable gripping elements and a carrier block therefor, a chamber formed by portions of said gripping elements and of said carrier block, a medium in said chamber capable of adapting itself to all shapes of said chamber acting as a rigid abutment, and means moving said gripping elements out of said chamber to a common alinement.

2. A gripping device comprising movable jaws composed of individually movable gripping elements and a carrier block therefor, a chamber formed by portions of said gripping elements and of said carrier block, a medium in said chamber capable of adapting itself to all shapes of said chamber, acting as a rigid abutment for transmitting pressure and a common means adapted to move all gripping elements out of said chamber thereby returning all said gripping elements to a normal position.

3. A gripping device as specified in claim 2 in which said means consists of a spring controlled bar adapted to bear upon some portion of said gripping elements.

In testimony whereof I affix my signature.

RUDOLF JOKSCH.